United States Patent
Marks et al.

(10) Patent No.: US 6,869,123 B2
(45) Date of Patent: Mar. 22, 2005

(54) INSTRUMENT PANEL THERMOPLASTIC ENERGY ABSORBERS

(75) Inventors: Matthew Marks, Waterford, MI (US); Daniel Woodman, Fowlerville, MI (US); Thomas M. Goral, Oakland Township, MI (US); Marc Stefan Black, West Bloomfield, MI (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/670,553

(22) Filed: Sep. 25, 2003

(65) Prior Publication Data

US 2004/0056463 A1 Mar. 25, 2004

Related U.S. Application Data

(63) Continuation of application No. PCT/US01/44085, filed on Nov. 26, 2001.

(51) Int. Cl.⁷ .............................................. B62D 25/14
(52) U.S. Cl. ............................ 296/70; 296/72; 280/752
(58) Field of Search ...................... 296/70, 72, 187.03, 296/193.02, 37.12, 192; 293/120, 121, 136; 280/752, 751; 180/90; 267/140

(56) References Cited

U.S. PATENT DOCUMENTS

| | | | |
|---|---|---|---|
| 3,831,705 A | 8/1974 | Glance | |
| 3,964,578 A | 6/1976 | Campbell et al. | |
| 3,984,128 A | 10/1976 | Oehm et al. | |
| 4,065,157 A | * 12/1977 | Abe et al. | 280/751 |
| 4,198,075 A | 4/1980 | Kob et al. | |
| 4,320,909 A | * 3/1982 | Nakamori et al. | 280/752 |
| 4,373,746 A | 2/1983 | Okuyama | |
| 4,421,343 A | 12/1983 | Yoshitsugu et al. | |
| 4,709,943 A | 12/1987 | Yoshimura et al. | |
| 4,805,924 A | 2/1989 | Birchfield et al. | |
| 4,978,136 A | 12/1990 | Tomita et al. | |
| 5,037,130 A | 8/1991 | Okuyama | |
| 5,096,223 A | 3/1992 | Tekelly et al. | |
| 5,273,314 A | 12/1993 | Sakakibara | |
| 5,456,494 A | 10/1995 | Witkovsky | |
| 5,482,319 A | * 1/1996 | Yoshimura et al. | 280/752 |
| 5,518,270 A | * 5/1996 | Hanada et al. | 280/751 |
| 5,570,901 A | 11/1996 | Fyrainer | |
| 5,676,216 A | * 10/1997 | Palma et al. | 296/70 |
| 5,865,468 A | * 2/1999 | Hur | 280/752 |
| 5,927,755 A | * 7/1999 | Matsuo et al. | 296/70 |
| 5,934,733 A | * 8/1999 | Manwaring | 296/72 |
| 6,299,208 B1 | * 10/2001 | Kasahara et al. | 280/752 |
| 6,520,849 B1 | * 2/2003 | Greenwald et al. | 296/70 |
| 6,702,324 B2 | * 3/2004 | Shimoyamada et al. | 280/752 |
| 2004/0036310 A1 | * 2/2004 | Mills | 296/72 |
| 2004/0108744 A1 | * 6/2004 | Scheib et al. | 296/70 |

FOREIGN PATENT DOCUMENTS

JP 2003312419 * 11/2003

* cited by examiner

Primary Examiner—Kiran Patel

(57) ABSTRACT

In an exemplary embodiment, an instrument panel assembly (10) includes an elongate beam structure (14) and a plurality of thermoplastic energy absorbers (16) coupled to the beam structure. The instrument panel assembly also includes at least one knee bolster (116) positioned adjacent the plurality of thermoplastic energy absorbers and an instrument panel (90).

14 Claims, 4 Drawing Sheets

INSTRUMENT PANEL THERMOPLASTIC
ENERGY ABSORBERS

This is a continuation of application No. of PCT/US01/44085 filed Nov. 26, 2001.

BACKGROUND OF THE INVENTION

This invention relates generally to automobile instrument panels, and more particularly to instrument panel thermoplastic energy absorbers.

Known instrument panel assemblies include a beam structure and at least one decorative instrument panel attached to the beam structure. Some of the decorative panels act as knee bolsters to protect the knees of vehicle occupants in the event of an impact. An instrument panel assembly is mounted inside the passenger compartment of an automobile with the beam structure attached to the automobile body, typically to the A-pillar. Known instrument panel beam structures are fabricated from steel, magnesium, aluminum, or plastic.

The instrument panel knee bolsters are supported by support brackets attached to the beam structure. In some known instrument panel assemblies, the support brackets provide energy absorbing capability to further protect passenger knees.

U.S. Pat. No. 5,312,133 describes an instrument panel assembly having knee bolsters. The instrument panel assembly includes a steel beam and a duct system attached to the steel beam. The duct system includes a front channel member and a rear channel member bonded together with adhesive to form the duct system. The knee bolsters are provided for absorbing kinetic energy from the knees of vehicle occupants in the event of an impact. The plastic reinforcements brackets transfer force from the knee bolsters without absorbing substantial kinetic energy from the knees. The plastic reinforcement brackets are either compression molded from random glass polypropylene or injection molded polycarbonate.

U.S. Pat. No. 5,676,216 describes an instrument panel assembly that includes a knee bolster assembly, an instrument panel, a reinforcement assembly, a beam duct assembly, and a fastening assembly. The beam assembly has a two-piece beam structure that includes an integrated air distribution system. Each piece of the beam structure is formed from sheet molding compound (SMC) and are bonded together with adhesive. The reinforcement assembly includes separate metal reinforcement members to support the knee bolsters of the instrument panel.

BRIEF DESCRIPTION OF THE INVENTION

In one aspect, an energy absorber for an instrument panel assembly that includes an elongate instrument panel beam structure, and a knee bolster is provided. The energy absorber includes a thermoplastic structure configured to attach to the instrument panel beam structure. The thermoplastic energy absorber structure includes a plurality of sides and a plurality of web members. At least some web members extend between the plurality of sides.

In another aspect, an instrument panel assembly is provided that includes an elongate beam structure and a plurality of thermoplastic energy absorbers coupled to the beam structure. The instrument panel assembly also includes at least one knee bolster positioned adjacent the plurality of thermoplastic energy absorbers and an instrument panel.

In another aspect, an instrument panel assembly is provided that includes an elongate continuous profile thermoplastic beam structure and a plurality of thermoplastic energy absorbers attached to the beam structure. Each energy absorber includes a plurality of sides and a plurality of web members with at least some web members extending between the plurality of sides. The instrument panel assembly also includes at least one knee bolster positioned adjacent the plurality of thermoplastic energy absorbers, and an instrument panel.

DETAILED DESCRIPTION OF THE INVENTION

An instrument panel assembly that includes thermoplastic energy absorbers is described below in detail. The thermoplastic energy absorbers support the knee bolsters of the instrument panel assembly and provide protection for vehicle occupant knees during an impact event. Energy is transferred from an occupant's knee through the knee bolster to the thermoplastic energy absorbers during an impact event. In such an event, the thermoplastic energy absorbers deform from the force of the occupant's knee against the knee bolster thereby absorbing energy from the occupant's knee.

The thermoplastic energy absorbers described below can be extruded or molded from one of many thermoplastic materials. Suitable thermoplastic materials include, but are not limited to, acrylonitrile-butadiene-styrene (ABS), polycarbonate, polycarbonate/ABS blend, a copolycarbonate-polyester, acrylic-styrene-acrylonitrile (ASA), acrylonitrile-(ethylene-polypropylene diamine modified)-styrene (AES), phenylene ether resins, glass filled blends of polyphenylene oxide and polystyrene, blends of polyphenylene ether/polyamide (NORYL GTX® from General Electric Company), blends of polycarbonate/PET/PBT, polybutylene terephthalate and impact modifier (XENOY® resin from General Electric Company), polyamides, phenylene sulfide resins, polyvinyl chloride PVC, high impact polystyrene (HIPS), low/high density polyethylene, polypropylene and thermoplastic olefins (TPO).

Figure 1:
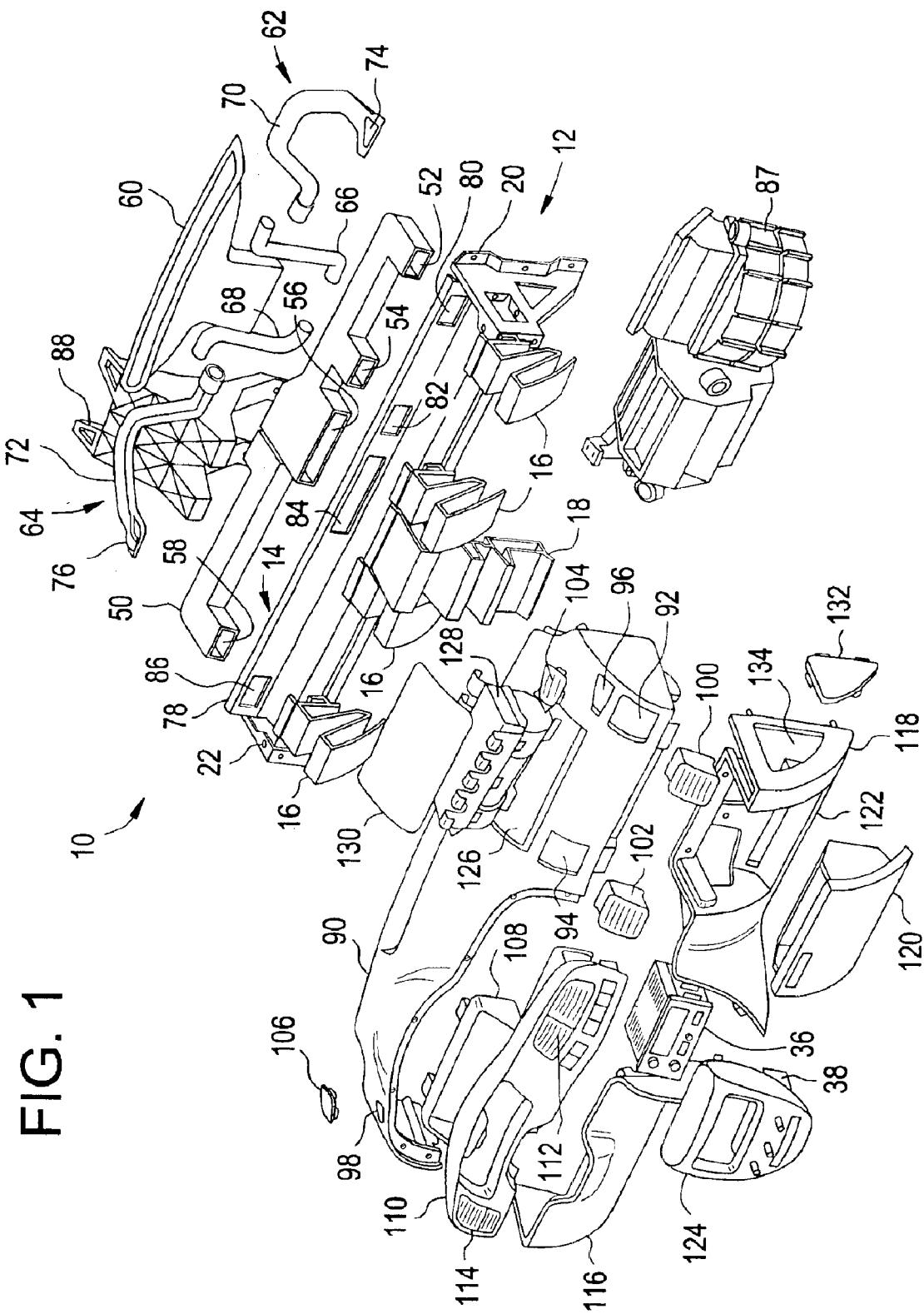
FIG. 1 is an exploded perspective view of an instrument panel assembly in accordance with an embodiment of the present invention.
Figure 2:
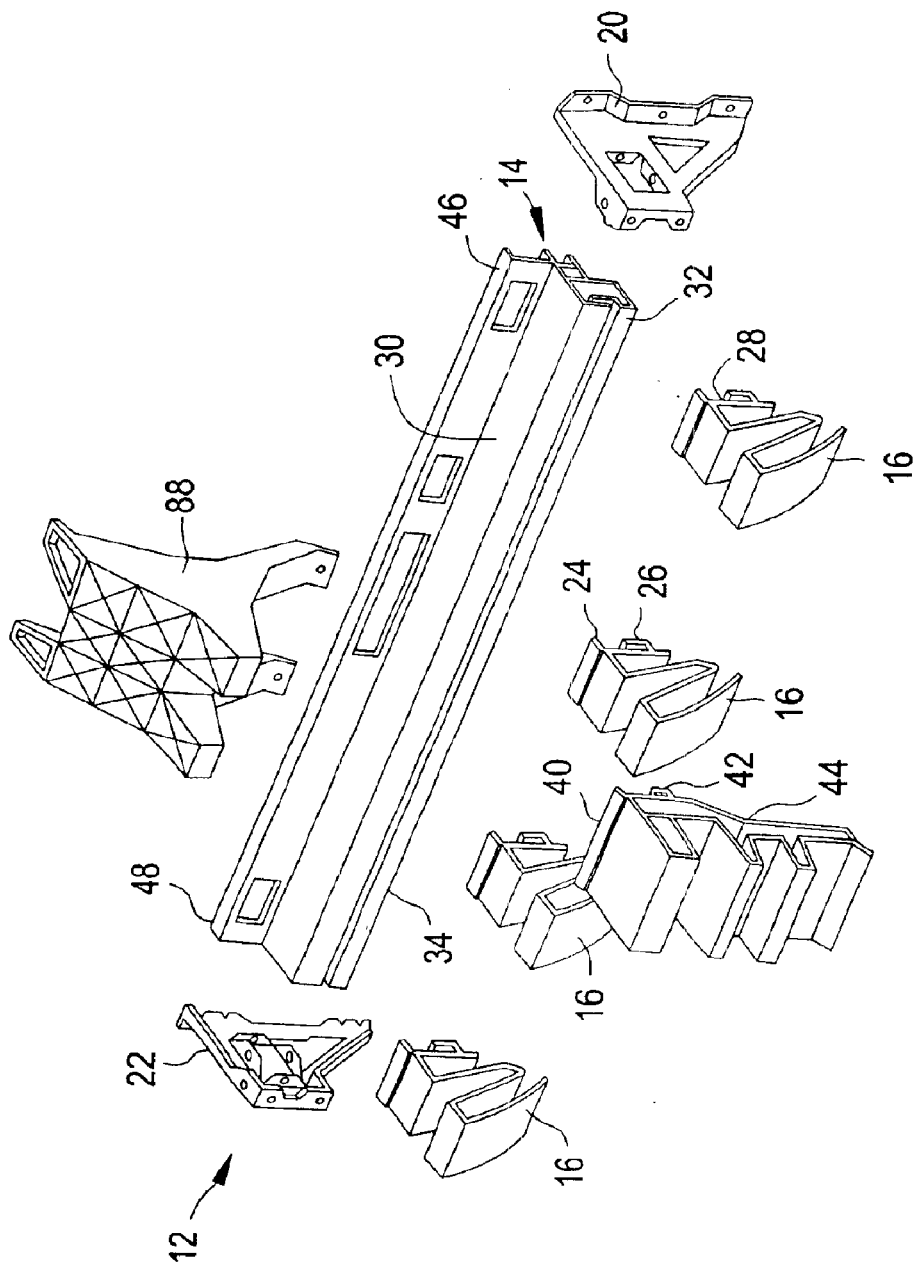
FIG. 2 is an exploded perspective view of the beam structure shown in FIG. 1.

Referring to the drawings, FIG. 1 is an exploded perspective view of an instrument panel assembly 10 in accordance with an embodiment of the present invention, and FIG. 2 is an exploded perspective view of a portion of instrument panel 10. Instrument panel assembly 10 includes an instrument panel beam assembly 12 that includes an elongate continuous profile thermoplastic beam structure 14, a plurality of thermoplastic energy absorbers 16, an extruded thermoplastic center stack 18, and end brackets 20 and 22. Energy absorbers 16, center stack 18 and end brackets 20 and 22 are coupled to beam structure 14. Continuous profile beam structure 14 is formed by any suitable method, for example, by an extrusion process or by a pultrusion process.

Thermoplastic energy absorbers 16 have a folded ribbon configuration with a substantially M-shaped cross section. Position tabs 24 and 26 extend from a rear side 28 of energy absorbers 16. Position tab 24 is sized to overlie a top surface 30 of beam structure 14, and position tab 26 is sized and shaped to be received into a longitudinal channel 32 in a front side 34 of beam structure 14. Particularly, in this exemplary embodiment, position tab 26 has an L-shaped cross section and is sized to slide into L-shaped channel 32. Energy absorbers 16 are attached to beam structure 14 by at least one of adhesive bonding, heat bonding, vibration welding, and fasteners.

Extruded thermoplastic center stack 18 is sized and shaped to receive vehicle system controls such as radio 36 and heating, ventilating, and air conditioning (HVAC) system controls 38. Position tabs 40 and 42 extend from a rear side 44 of center stack 18. Position tab 40 is sized to overlie top surface 30 of beam structure 14, and position tab 42 is sized and shaped to be received into longitudinal channel 32 of beam structure 14. Particularly, in this exemplary embodiment, position tab 42 has an L-shaped cross section and is sized to slide into L-shaped channel 32. Center stack 18 is attached to beam structure 14 by at least one of heat bonding, vibration welding and fasteners.

End brackets 20 and 22 are attached to opposing ends 46 and 48 of beam structure 14 and are configured to couple beam structure 14 to the vehicle body (not shown). End brackets 20 and 22 are attached to beam structure 14 by any suitable means, for example, fasteners, adhesives, and snap-fit methods. End brackets 20 and 22 are fabricated from any suitable material, for example, steel, aluminum, and thermoplastics.

Instrument panel assembly 10 also includes a main HVAC duct 50 having duct outlets 52, 54, 56, and 58, a front window duct 60, and side window ducts 62 and 64. Side window ducts 62 and 64 include first duct portions 66 and 68, second duct portions 70 and 72, and duct outlets 74 and 76 respectively. Beam structure 24 includes a flange 78 extending from top surface 30. Flange 78 includes openings 80, 82, 84, and 86 sized to receive duct outlets 52, 54, 56, and 58 respectively. Main HVAC duct 50, front window duct 60, and side window ducts 62 and 64 are coupled to an HVAC module 87.

Instrument panel assembly 10 also includes a steering column support bracket 88 coupled to beam structure 14. Steering column support bracket 88 is fabricated from any suitable material, for example, steel, cast aluminum, cast magnesium, and molded thermoplastic.

Instrument panel assembly 10 further includes an instrument panel 90 having duct outlet openings 92, 94, 96, and 98 sized to receive vent grills 100, 102, 104, and 106 respectively. Vent grills 100, 102, 104, and 106 communicate with duct outlets 52, 54, 74, and 76 respectively. An instrument cluster 108 and a cluster trim plate 110 are coupled to instrument panel 90. Cluster trim plate 110 includes vent grills 112 and 114 which communicate with duct outlets 56 and 58 respectively. A driver side knee bolster 116 and a glove box surround 118 are coupled to instrument panel 90 and supported by energy absorbers 16. A glove box 120 attaches to a glove box hinge portion 122 of glove box surround 118. The combination of glove box surround 118 and glove box 120 act as a passenger knee bolster. A center bezel 124 is coupled to driver side knee bolster 116 and glove box surround 118. Instrument panel 90 also includes an opening 126 sized to receive a passenger side inflatable restraint (PSIR) module 128. A PSIR door 130 is sized to close opening 126. A fuse access door 132 covers a fuse access opening 134 in glove box surround 118.

Figure 3:
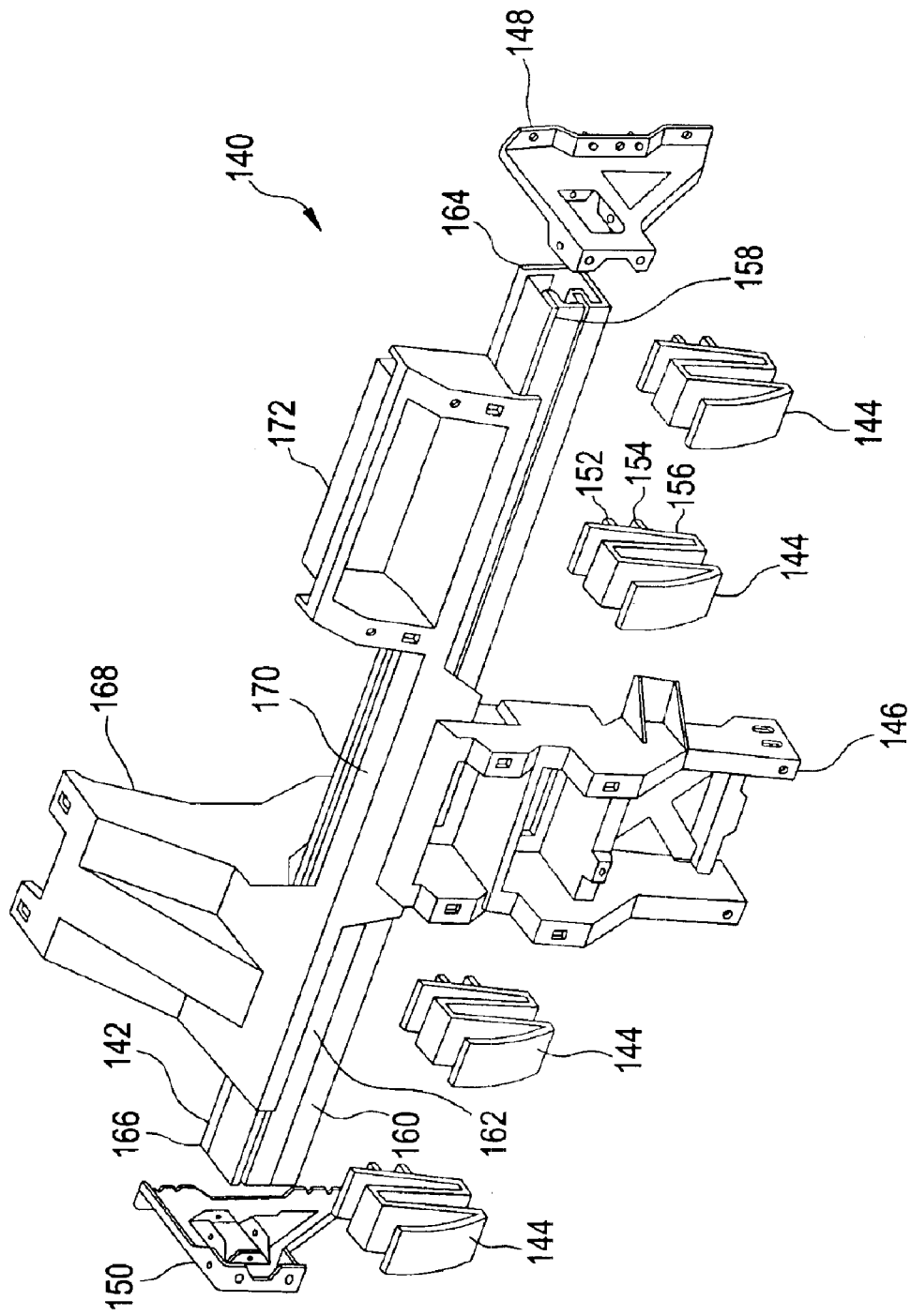
FIG. 3 is an exploded perspective view of an instrument panel beam assembly in accordance with an embodiment of the present invention.

FIG. 3 is an exploded perspective view of an instrument beam assembly 140 in accordance with another embodiment of the present invention. Instrument beam assembly 140 includes an elongate beam structure 142, a plurality of thermoplastic energy absorbers 144, a center stack 146, and end brackets 148 and 150. Energy absorbers 144, center stack 146 and end brackets 148 and 150 are coupled to beam structure 142.

Thermoplastic energy absorbers 144 have a folded ribbon configuration with a substantially W-shaped cross section. Position tabs 152 and 154 extend from a rear side 156 of energy absorbers 144. Position tab 152 is sized and shaped to be received into a first longitudinal channel 158 in a front side 160 of beam structure 142, and position tab 154 is sized and shaped to be received into a second longitudinal channel 162 in beam structure front side 160. Beam structure 142 is fabricated from any suitable material, for example steel, aluminum, titanium, extruded aluminum, extruded titanium, extruded thermoplastic, pultruded thermoplastic, and molded thermoplastic. In one embodiment, beam structure has a continuous profile and is formed by extrusion or roll forming. Energy absorbers 144 are attached to beam structure 142 by at least one of adhesive bonding, heat bonding, vibration welding and fasteners.

End brackets 148 and 150 are attached to opposing ends 164 and 166 of beam structure 142 and are configured to couple beam structure 142 to the vehicle body (not shown). End brackets 148 and 150 are attached to beam structure 142 by any suitable means, for example, fasteners, adhesives, and snap-fit methods. End brackets 148 and 150 are fabricated from any suitable material, for example, steel, aluminum, and thermoplastics.

Instrument panel beam assembly 140 also includes a steering column support 168 coupled to beam structure 142 by an attachment bracket 170. A center stack 146 and a PSIR module 172 are also coupled to beam structure 142 by attachment bracket 170. Center stack 146 is fabricated from any suitable material, for example, steel, aluminum, magnesium, and molded thermoplastic.

Figure 4:
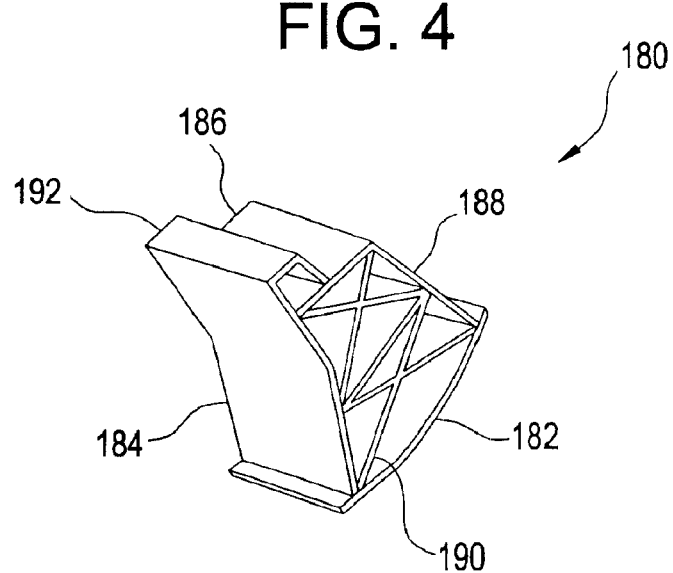
FIG. 4 is a perspective view of a thermoplastic energy absorber in accordance with an embodiment of the present invention.

FIG. 4 is a perspective view of a thermoplastic energy absorber 180 in accordance with another embodiment of the present invention. Thermoplastic energy absorber 180 has a box shape having sides 182, 184, 186, and 188. Web members 190 extend between sides 184 and 188. A positioning tab 192 extends from side 186. Side 186 is configured to couple to a beam structure (not shown) and side 182 is configured to engage a knee bolster (not shown).

Figure 5:
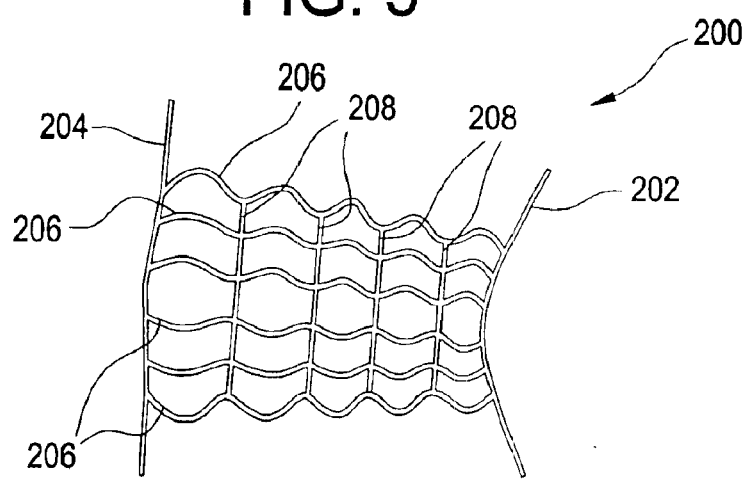
FIG. 5 is a schematic side view of a thermoplastic energy absorber in accordance with an embodiment of the present invention.

FIG. 5 is a schematic side view of a thermoplastic energy absorber 200 in accordance with another embodiment of the present invention. Thermoplastic energy absorber 200 includes a first side 202 and a second side 204. First side 202 is configured to attach to an instrument panel beam structure, for example beam structure 14 described above. Second side 204 is configured to support a knee bolster, for example, knee bolster 116 described above. Energy absorber 200 further includes web members 206 and 208. Web members 206 extend between first and second sides 202 and 204, and web members 208 extend between web members 206. Web members 206 and 208 form a honeycomb configuration.

Figure 6:
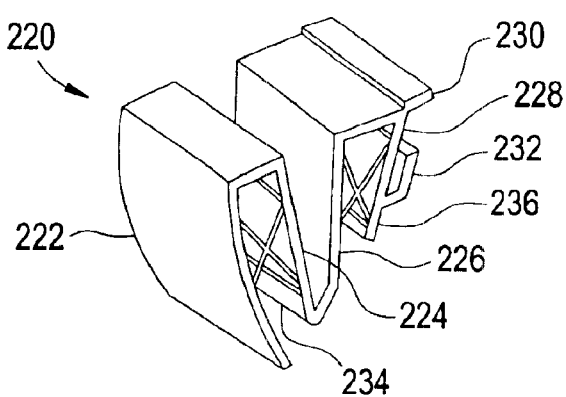
FIG. 6 is a perspective view of a thermoplastic energy absorber in accordance with an embodiment of the present invention.

FIG. 6 is a perspective view of a thermoplastic energy absorber 220 in accordance with another embodiment of the present invention. Thermoplastic energy absorber 220 have a folded ribbon configuration with a substantially M-shaped cross-section, and includes sides 222, 224, 226, and 228. Position tabs 230 and 232 extend from side 228 of energy absorber 220. Web members 234 extend between sides 222 and 224, and web members 236 extend between sides 226 and 228.

Thermoplastic energy absorbers 16, 144, 180, 200 and 220 described above are exemplary configurations of thermoplastic energy absorbers in accordance with three exemplary non-limiting embodiments of the present invention. In alternate embodiments, the thermoplastic energy absorbers can have different and varying shapes that are capable of deforming from the force of a vehicle occupant's knee against the knee bolster in an impact event, and thereby absorbing energy from the occupant's knee.

While the invention has been described in terms of various specific embodiments, those skilled in the art will recognize that the invention can be practiced with modification within the spirit and scope of the claims.

What is claimed is:

1. An instrument panel assembly comprising:
   an elongate beam structure;
   a plurality of thermoplastic energy absorbers attached to said beam structure, said plurality of thermoplastic energy absorbers comprise a plurality of sides and a plurality of web members, at least some web members extending between said plurality of sides;
   at least one knee bolster positioned adjacent said plurality of thermoplastic energy absorbers; and
   an instrument panel.

2. The instrument panel assembly in accordance with claim 1 wherein said plurality of web members comprise a honeycomb configuration.

3. The instrument panel assembly in accordance with claim 1 further comprising a center stack coupled to said beam structure.

4. The instrument panel assembly in accordance with claim 3 wherein said center stack comprises an extruded thermoplastic center stack sized to receive vehicle system controls.

5. The instrument panel assembly in accordance with claim 1 wherein said beam structure comprises at least one longitudinal channel.

6. The instrument panel assembly in accordance with claim 5 wherein said energy absorbers comprise at least one position tab sized and shaped to be received in said at least on longitudinal channel of said beam structure.

7. The instrument panel assembly in accordance with claim 5 wherein said beam structure comprises a continuous profile thermoplastic beam structure.

8. The instrument panel assembly in accordance with claim 1 wherein said plurality of energy absorbers coupled to said beam structure by at least one of adhesive bonding, heat bonding, vibration welding and fasteners.

9. The instrument panel assembly in accordance with claim 5 wherein said beam structure comprises an extruded or roll-formed metal beam structure.

10. The instrument panel assembly in accordance with claim 7 wherein said energy absorbers comprise at least one position tab sized and shaped to be received in said at least one longitudinal channel of said continuous profile thermoplastic beam structure.

11. The instrument panel assembly in accordance with claim 7 further comprising an extruded thermoplastic center stack coupled to said continuous profile thermoplastic beam structure.

12. The instrument panel assembly in accordance with claim 11 wherein said center stack comprises at least one position tab sized and shaped to be received in said longitudinal channel of said continuous profile thermoplastic beam structure.

13. The instrument panel assembly in accordance with claim 7 wherein said plurality of extruded thermoplastic energy absorbers are coupled to said continuous profile thermoplastic beam structure by at least one of adhesive bonding, heat bonding, vibration welding and fasteners.

14. The instrument panel assembly in accordance with claim 1 wherein said plurality of sides comprise a substantially box shaped configuration, a substantially M-shaped configuration or a substantially W-shaped configuration.

* * * * *